United States Patent
Merlet et al.

(10) Patent No.: US 7,606,963 B2
(45) Date of Patent: Oct. 20, 2009

(54) MULTIMEDIA INTERFACE DEVICE, INFORMATION PROCESSING METHOD CORRESPONDING INFORMATION CARRIER AND COMPUTER PROGRAM

(75) Inventors: Hervé Merlet, Servon-sur-Vilaine (FR); Stéphane Bizet, Rennes (FR); Laurent Frouin, Rennes (FR); Sylvain Buriau, Cesson-Sévigné (FR); Philippe Le Bars, Thorigné-Fouillard (FR); Arnaud Closset, Cesson-Sévigné (FR)

(73) Assignee: Canon Europa N. V., Amstelveen (NL)

( * ) Notice: Subject to any disclaimer, the term of this patent is extended or adjusted under 35 U.S.C. 154(b) by 646 days.

(21) Appl. No.: 11/188,218

(22) Filed: Jul. 25, 2005

(65) Prior Publication Data

US 2006/0036797 A1 Feb. 16, 2006

Related U.S. Application Data

(63) Continuation of application No. PCT/IB2004/000858, filed on Jan. 22, 2004.

(30) Foreign Application Priority Data

Jan. 24, 2003 (FR) .................................. 03 00833

(51) Int. Cl.
*G06F 13/14* (2006.01)
*H04L 12/50* (2006.01)

(52) U.S. Cl. ........................................ 710/315; 370/466
(58) Field of Classification Search ................ 710/315, 710/306, 311; 370/465–467
See application file for complete search history.

(56) References Cited

U.S. PATENT DOCUMENTS 6,549,951 B1 * 4/2003 Hui et al. .................... 709/250

7,165,121 B2 * 1/2007 Richman ..................... 709/250

(Continued)

FOREIGN PATENT DOCUMENTS

EP 0 596 652 A1 10/1993

(Continued)

OTHER PUBLICATIONS

"Design of Home Network Gateway for Real-Time A/V Streaming between IEEE1394 and Ethernet", Jeong et al., May 2007, pp. 390-396.*

(Continued)

*Primary Examiner*—Mark Rinehart
*Assistant Examiner*—Trisha Vu
(74) *Attorney, Agent, or Firm*—Fitzpatrick, Cella, Harper & Scinto

(57) ABSTRACT

A multimedia interface device for the transfer of information in a communications network comprises:
  at least two connection means to which, respectively, at least two sending devices can get connected by means respectively of two communications links compliant respectively with two protocols;
  means of connection to a single remote switching device by means of a single cable, the switching device comprising at least switching means between at least two ports;
  means to mix the information sent out by sending devices into only one stream of information in the form of segments being able to contain part of the information; and
  means to transfer the stream of information in the form of segments on at least one pair of cable to the switching device to which it is connected according to a third protocol.

32 Claims, 13 Drawing Sheets

U.S. PATENT DOCUMENTS

| | | | |
|---|---|---|---|
| 7,180,908 B2 * | 2/2007 | Valavi et al. | 370/465 |
| 2001/0037422 A1 | 11/2001 | Thaler et al. | 710/126 |
| 2002/0152346 A1 | 10/2002 | Stone et al. | 710/305 |
| 2003/0112965 A1 * | 6/2003 | McNamara et al. | 379/399.01 |
| 2005/0058390 A1 * | 3/2005 | Iwai | 385/15 |

FOREIGN PATENT DOCUMENTS

| | | |
|---|---|---|
| EP | 124 357 A1 | 2/2001 |
| WO | WO 98/11686 | 3/1998 |
| WO | WO 99/65196 | 12/1999 |
| WO | WO 2004/066557 A1 | 8/2004 |

OTHER PUBLICATIONS

Hiroshi Shimizu et al., "IVDLAN Standardization and Development", 2334 The Transactions of the Institute fo Electronics, Information and Comm. Engineers E74(Sep. 1991), No. 9, Tokyo, Japan, pp. 2696-2702.

* cited by examiner

MULTIMEDIA INTERFACE DEVICE, INFORMATION PROCESSING METHOD CORRESPONDING INFORMATION CARRIER AND COMPUTER PROGRAM

RELATED APPLICATIONS

This is a continuation of PCT/IB2004/000858, filed Jan. 22, 2004, and claims benefit of that application under 35 U.S.C. § 120, as well as benefit UNDER 35 U.S.C. § 119 of French Application 03 00808, filed Jan. 24, 2003. The entire contents of both those applications are hereby incorporated herein by reference.

BACKGROUND OF THE INVENTION

1. Field of the Invention

The present invention relates to a communications network enabling the connection of a plurality of devices that process data in different formats.

More particularly, the invention is situated in the framework of a home type network.

2. Description of the Prior Art

The modern devices with which a family may be equipped often have to transmit different types of data such as video, sound, photos, text files etc. and the like. The transmission of this data is governed by requirements that are variable depending on the type of data considered. This data must be conveyed especially by means of cables or adapted links. Thus, each data format has a corresponding adapted means of transportation and a type of connector used to connect devices with one another. For example, devices processing digital data may work according to the IEEE-1394 standard.

In order to extend the possibilities of interconnection of devices in a house, there are networks comprising nodes in which interfaces are designed are with different connectors such as, for example, 1394 type connectors, Ethernet type connectors which enable the connection of the corresponding devices. This enables the networking of several devices. However, the connections must be made on one of the nodes of the network or on a hub. The data is then processed independently. There is no provision for conveying several types of data together, on the same transportation means. If the interface comprising several connectors has to be shifted to a wall socket, then it will be necessary to provide as many transportation means, such as cables, as there are different connectors. For cabling in a house, it becomes cumbersome to make several cables go through the walls.

The publication "Home information wiring system using UTP cables for IEEE 1394 and Ethernet systems" in the journal IEEE transactions on Consumer Electronics Vol 47, No. 4, November 2001, describes an adapter which can be used to connect an IEEE1394 cable and an Ethernet cable to an UTP 5 cable comprising four twisted pairs. To do this, the above-mentioned article describes the use of two twisted pairs to obtain the passage of an IEEE1394 signal and two other twisted pairs to obtain the passage of an Ethernet signal.

This publication does not describe the possibility of bringing about the transit, on this same cable, of other data having different formats such as telephone type data.

Furthermore, the transmission of IEEE1394 or Ethernet type data is limited in this case to 100 Mbps. Now, the fact is that use of these protocols in the context of home applications requires far greater transmission capacity, especially for video applications. Furthermore, this distribution of the data requires an equitable sharing of the bandwidth between all the data formats: this is not always so in reality. Indeed, it is sometimes necessary to plan for a bandwidth that is dynamically greater for one type of data as compared with another type of data.

The different types of data that may travel in a home network have variable requirements in order to be transmitted. Thus, the transfer of video type data for example necessitates a particular, continuous bit rate. The same is true for sound. In this case, it is said that the data is isochronous data. On the contrary, for a text file, the data does not need to be transmitted continuously or even regularly. In this case, it is said that the data is asynchronous data. Another example of asynchronous data consists of the commands to turn various apparatuses on or off, and also data intended for printers. A home network must therefore be able to obtain the transit of the asynchronous data as well as isochronous data, this isochronous data having to travel at certain variable speeds and bit rates.

The patent application EP1124357, describes a communications network in which the communications nodes interconnect different IEEE1394 type networks by means of a switched network.

The nodes comprise IEEE1394 type interfaces with a switching unit comprising three input/output ports. They transfer the IEEE1394 packets by one of the input/output ports and send it to another communications node.

The fact is that the configuration of these nodes is not particularly suited to a simple installation in a home environment.

Indeed, the communications nodes as described comprise a plurality of IEEE1355 type connections, and therefore a large number of cables are necessary to provide for the efficient operation of this network.

This large number of cables and connections to be set up makes it difficult to install a network of this kind and above all generates problems of positioning cables and obtaining their passage in a home environment.

Furthermore, the technologies related to the transmission of multimedia information are developing very rapidly, and it is therefore necessary to envisage communications network that can be easily upgraded.

Thus, if new interconnection standards appear, the possessor of such a network will find it necessary to change all the communications nodes even though only one sub-part of these nodes needs to be modified.

The cost associated with this modification therefore entails penalties for the possessor of this network.

SUMMARY OF THE INVENTION

The invention seeks to resolve the drawbacks of the prior art by proposing a multimedia interface device for the transfer of information in a communications network, wherein the multimedia interface device comprises:
  at least one first connection means to which at least one first communications device, called a first sending device, can get connected by means of a first communications link compliant with a first protocol,
  at least one second connection means to which at least one second communications device, called a second sending device, can get connected by means of a second communications link compliant with a second protocol,
  means of connection to a single remote device by means of a single cable constituted by at least one pair, said remote device called a switching device comprising at least switching means between at least two ports,
  means to mix the information sent out by said at least two devices into only one stream of information in the form of segments, each segment being able to contain part of the information sent out by the first device and/or by the second device, means to transfer the stream of information in the form of segments on said at least one pair of said cable to the switching device to which it is connected according to a third protocol different from the first and second protocols.

Thus, the separation of the multimedia interface device and of the switching device makes it easier to set up a network of this kind. The multimedia interface device placed in the vicinity of the information sources will enable the mixing of this information so that it can be transmitted by means of a single medium.

The remote switching device could also be positioned in such a way as to enable the making of a network topology in a star configuration.

Finally, if the new interconnection standards appear, only the multimedia interface device would have to be replaced or modified.

In a particular embodiment, the device comprises a means to obtain packets from the information sent out by the at least two devices, a segment being able to contain the obtained packets or part of the obtained packets.

More specifically, the first protocol is a protocol adapted to the transfer of multimedia information by isochronous or asynchronous type data packets. It is for example compliant with the IEEE1394 standard.

More specifically, the means used for mixing comprise means for the reservation of bandwidth in the communications network. These bandwidth reservation means ensure a minimum bandwidth for the isochronous type multimedia information and ensure a maximum bandwidth for the asynchronous type multimedia information.

In a particular embodiment, the second protocol is a protocol adapted to the transfer of information by Ethernet type packets.

According to another particular embodiment, the interface device furthermore comprises means for the reception of information coming from the switching device to which it is connected, means to determine the connection means to which the device that is the destination of the information is connected and means for the transfer of said received information to the determined connection means.

According to a particular embodiment, the segments furthermore comprise information representing the state of occupancy of the ports of the switching device to which the device is connected. This will enable optimum management of the resources of the switching device and will prevent the problems of saturation of the communications ports.

According to another particular embodiment, the cable consists of four pairs, two pairs dedicated to the sending of information and two pairs dedicated to the reception of information, and on the transmission pairs dedicated to sending or reception, one pair transmits segments comprising most significant bits of the information bytes sent by the sending devices and the other pair transmits segments comprising least significant bits of the information bytes sent by the sending devices.

More specifically, the means of connection to the switching device comprise, for each pair, a midpoint-grounded transformer and the interface device comprises means for obtaining electrical power connected to said midpoints of the transformers.

In a particular embodiment, the interface device comprises means for the connection of a telephone communications device to a telephone line by means of midpoints of two transformers.

According to another particular embodiment, the means of connection to a single remote device comprises a wall socket, integrated in a wall and connected to the single remote device and to the multimedia device by means of a single medium.

More specifically, the multimedia interface device is located, outside the wall, on one side of the wall and the remote device is located on the other side of the wall.

More specifically, the single medium is a CAT 5 type cable and the wall socket is a RJ 45 type socket.

More specifically, the wall socket is connected to the single remote device through a multiple rack by means of a single medium, the multiple rack being connected to a plurality of wall sockets, and selectively allowing one of the plurality of the wall sockets to communicate with the single remote device.

Finally, the multimedia interface device is located outside the wall, on one side of the wall and the remote device and the multiple rack are located on the other side of the wall.

According to another particular embodiment, the multimedia interface device comprises filtering means to filter signals coming from a telephone communications device connected to said at least one pair of the single cable.

Correlatively, the invention proposes a switching device for the transfer of information in a communications network, wherein the switching device comprises:

means of connection to at least one remote multimedia interface device by means of a single cable consisting of at least one pair, at least two communications ports with which information storage means are associated, it being possible to connect the communications ports to a second switching device or to a second multimedia interface device, switching means to transfer information between the ports and/or between the connection means and to at least one of the ports, means for obtaining information representing the quantity of information contained in the information storage means, means for the transfer of the information obtained towards said at least one device to which the switching device is connected.

In one variant, the means of connection to the switching device comprise, for each pair, a midpoint-grounded transformer and the interface device comprises electrical power supply means connected to said midpoints of the transformers.

Correlatively, the invention proposes a method of information processing in a multimedia interface device for the transfer of information in a communications network, the multimedia interface device comprising at least one first connection means to which at least one first communications device, called a first sending device, can be connected by means of a first communications link compliant with a first protocol, at least one second connection means to which at least one second communications device, called a second sending device, can get connected by means of a second communications link compliant with a second protocol, means of connection to a single remote device by means of a single cable constituted by at least one pair, said remote device called a switching device comprising at least means of switching between at least two ports and wherein the method comprises the steps of:

the mixing of the information sent by said at least two
sending devices, the transfer of the mixed information on said at least one
pair of said cable to the switching device to which it is
connected according to a third protocol different from
the first and second protocols.

The invention also relates to a totally or partially detachable information carrier, which can be read by a computer system, wherein the information carrier contains instructions from a computer program, enabling the implementation of the method as described here above.

The invention also relates to the computer program stored in any information carrier, said program comprising instructions with which to implement the processing method described here above, when it is loaded and executed by a computer system.

BRIEF DESCRIPTION OF THE DRAWINGS

Other particular features and advantages of the invention shall appear from the following description, made with reference to the appended drawings, of which.

MORE DETAILED DESCRIPTION

Figure 1A:
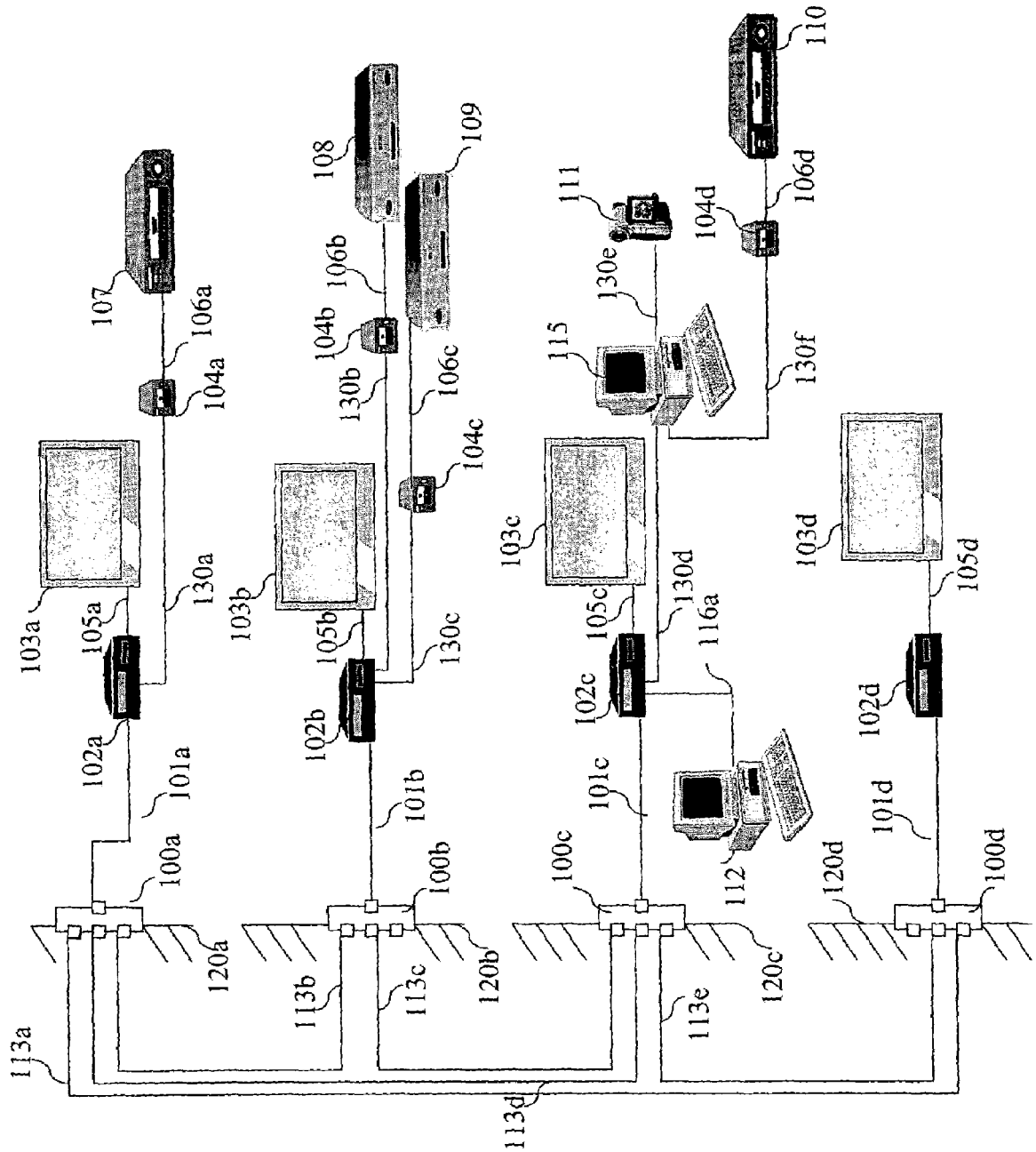
FIG. 1a shows a communications system according to the invention.

FIG 1a shows a multimedia communications network according to the invention. This network is installed, for example, in a home environment.

This multimedia communications network interconnects equipment such as television sets referenced 103a, 103b, 103c and 103d, videocassette recorders referenced 107 and 110, DVD type readers referenced 108 and 109.

Computer type devices referenced 112 and 115 may also be connected to this network.

To these computers, it is also possible to connect, for example, a digital camera referenced 111.

According to the invention, this network comprises multimedia interface devices referenced 102a 102b, 102c and 102d. The multimedia interface device 102a is connected to a switching device 100a by means of a single medium, in the present case a cable 101a.

This same switching device 100a is connected to other switching devices referenced 100b, 100c and 100d. The switching device 100a is connected by means of a cable 113a to the switching device 100d. It is also connected by means of another cable 113d to the switching device 100c which is itself connected by another link 113e to the switching device 100d.

The switching device 100c is connected to the switching device 100b by means of a link 113c and finally the switching device 100b is connected to the switching device 100a by means of a communications link 113b.

It must be noted that the communications devices 100a, 100b, 100c and 100d are inserted according to a particular mode of the invention in the partition walls of a dwelling.

The device 100a is placed, for example, in the partition wall 120a of a room such as a living room, the device 100b in the partition wall 120b of another room such as the kitchen and the device 100c in the partition wall 120c of a room such as a study, the device 100d in the partition wall 120d of a bedroom.

The multimedia interface device 102a is connected by means of an analog video link 105a to the television set 103a. The multimedia interface device 102a is also connected by means of a link 130a according to the standard IEEE1394 to an analog-digital converter which is itself connected to a video cassette recorder 107 by means of a link 106a.

The multimedia interface devices 102a, 102b, 102c and 102d are respectively connected to the switching devices 100a, 100b, 100c and 100d by means of transmission media which are more particularly CAT5 type cables 101a, 101b, 101c and 101d consisting of four pairs of twisted wires. This type of cable is classically used in Ethernet type networks.

It must be noted that other media could be used, for example fiber-optic links or cables according to the IEEE1355 standard.

The CAT5 type cables 101a, 101b, 101c and 101d are particularly well suited to the invention because they are very widely used and very reasonably priced.

The analog television sets 103b, 103c and 103d are respectively connected to the multimedia interface devices 102b, 102c and 102d respectively by links 105b, 105c and 105d identically to the link 105a connecting the analog television set 103a and the multimedia interface device 102a.

The multimedia interface device 102b is connected by an IEEE 1394 type link referenced 130b to an analog/digital converter 104b which will generate the analog video information generated by the DVD reader 108 in a format compatible with the IEEE1394 standard. The DVD reader 108 is connected to the analog/digital converter 104b by an analog link 106b comprising RCA type connectors.

The multimedia interface device 102b is connected by a second link 130c, identical to the link 130b, to an analog-digital link 104c identical to the converter 104b itself connected to a DVD reader 109 by means of a link 106c. Since the connections are identical to those described earlier, they shall not be described in greater detail. It must be noted that any type of device that generates analog information, for example a camera or a microphone, can be connected to the analog-digital converter 104c.

The multimedia interface device 102c is connected by means of an Ethernet type link 116a to a computer 112.

The multimedia interface device 102c has a second computer 115 connected to it by an IEEE 1394 type link referenced 130d. This computer 115 also has a digital camcorder 111 connected to it by means of an IEEE 1394 type link referenced 130e and an analog video tape recorder 110 connected to it by means of an analog-digital converter 104d identical to the converter 104c described here above. Since the link 130f is identical to the link 130c, it shall not be described. This is also the case for the link 106d with the link 106b.

It must be noted that each of the multimedia interface devices described here above comprises at least connection means of the Ethernet and IEEE1394 types and at least one analog video output. All the information obtained or delivered by this connection means will be distributed to other remote multimedia interface devices by means of a single CAT5 type cable.

This cable 101a will greatly simplify the installation of such a network in a home environment. Indeed, only one cable will be needed to connect the multimedia interface device 102a to the wall socket 100a. This is also the case for the cables 101b, 101c or 101d.

The wall sockets 100a, 100b, 100c and 100d comprising communications means and several input/output ports will be interconnected by means of multiple connections enabling efficient routing of the data. Since these multiple connections are integrated into the infrastructure of the house, they will not be a source of inconvenience to the user of such a network.

Figure 1B:
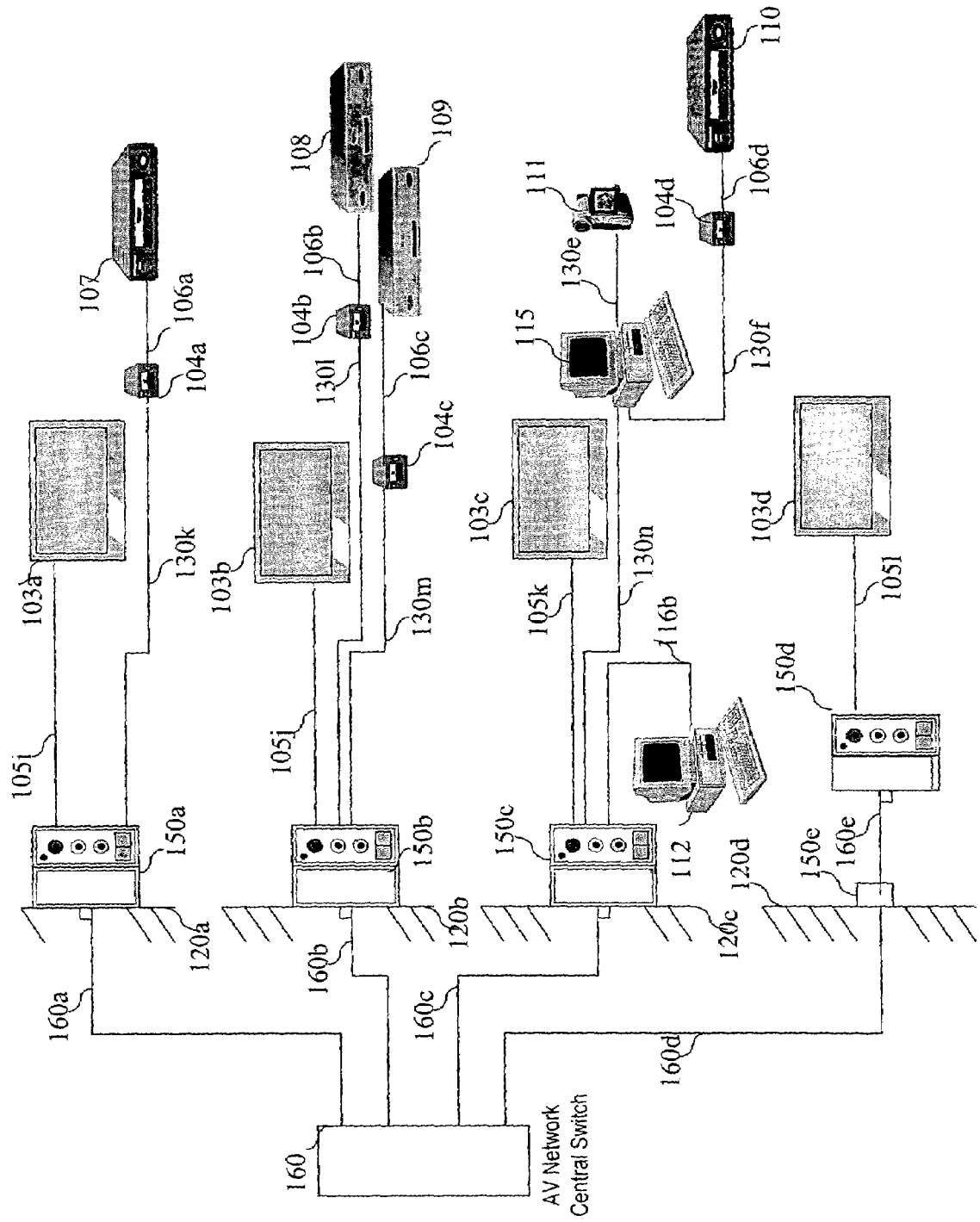
FIGS. 1b and 1c show alternative embodiments of the communications system according to the invention.

Referring to FIG. 1b, we shall now describe a variant of the invention. In FIG. 1b the multimedia interface devices referenced 102a, 102b and 102c of FIG. 1a are respectively integrated into the partition walls 120a, 120b and 120c. They are referenced 150a, 150b and 150c in FIG. 1b. The multimedia interface device 102d of FIG. 1a is not integrated into the wall. It is referenced 150d in FIG. 1b. The switching devices 100a, 100b, 100c and 100d for their part are grouped in a central switching unit 160 preferably placed beside the power supply panel. This configuration brings numerous advantages: indeed a single medium and more specifically a single cable, respectively 160a, 160b, 160c, 160d and 160e will connect the different parts of the house to the central switching unit 160. This will simplify the installation of the network and also reduce its cost. The link 160d is connected to a classic RJ45 type wall socket 150e and is extended by an external link 160e.

The interconnections referenced 113a, 113b, 113c, 113d and 113e in FIG. 1a will be set up in the central switching unit 160. For simplicity's sake, they are not shown here.

The links 105i, 105j, 105k and 105l are identical to the links 105a, 105b, 105c and 105d of FIG. 1a and shall not be described in greater detail.

The links 130k, 130l, 130m and 130n are identical to the links 130a, 130b, 130c and 130d of FIG. 1a and shall not be described in greater detail.

The link 116b is identical to the link 116a of FIG. 1a, and shall not be described in greater detail.

The devices such as the television sets, video cassette recorders, analog/digital converters, DVD readers, camcorders and micro-computers as well as the associated links are identical to those described with reference to FIG. 1a and shall not be described in greater detail.

According to another variant, not shown in the figure, the multimedia devices 150a, 150b, 150c are not integrated into the partition walls, this being done in the same way as the multimedia interface 150d. These interfaces are connected respectively by means of a single medium, more specifically a CAT5 type cable, to an RJ45 type wall socket.

These same wall sockets are respectively connected by means of a CAT5 type cable to the central switching unit 160 preferably placed beside the power supply cable.

When a dwelling has a pre-existing type of Ethernet network using the same type of cable as the one used in this invention, this variant will enable this pre-existing network to be upgraded into a network according to the invention.

This upgrading or development will then consist of the replacement of the hub of the pre-existing Ethernet network by a central switch unit and the connection of the multimedia interfaces 150a, 150b, 150c and 150d to the RJ45 type wall sockets.

Thus, the wiring of the dwelling does not have to be modified, and nor do the wall sockets.

Figure 1C:
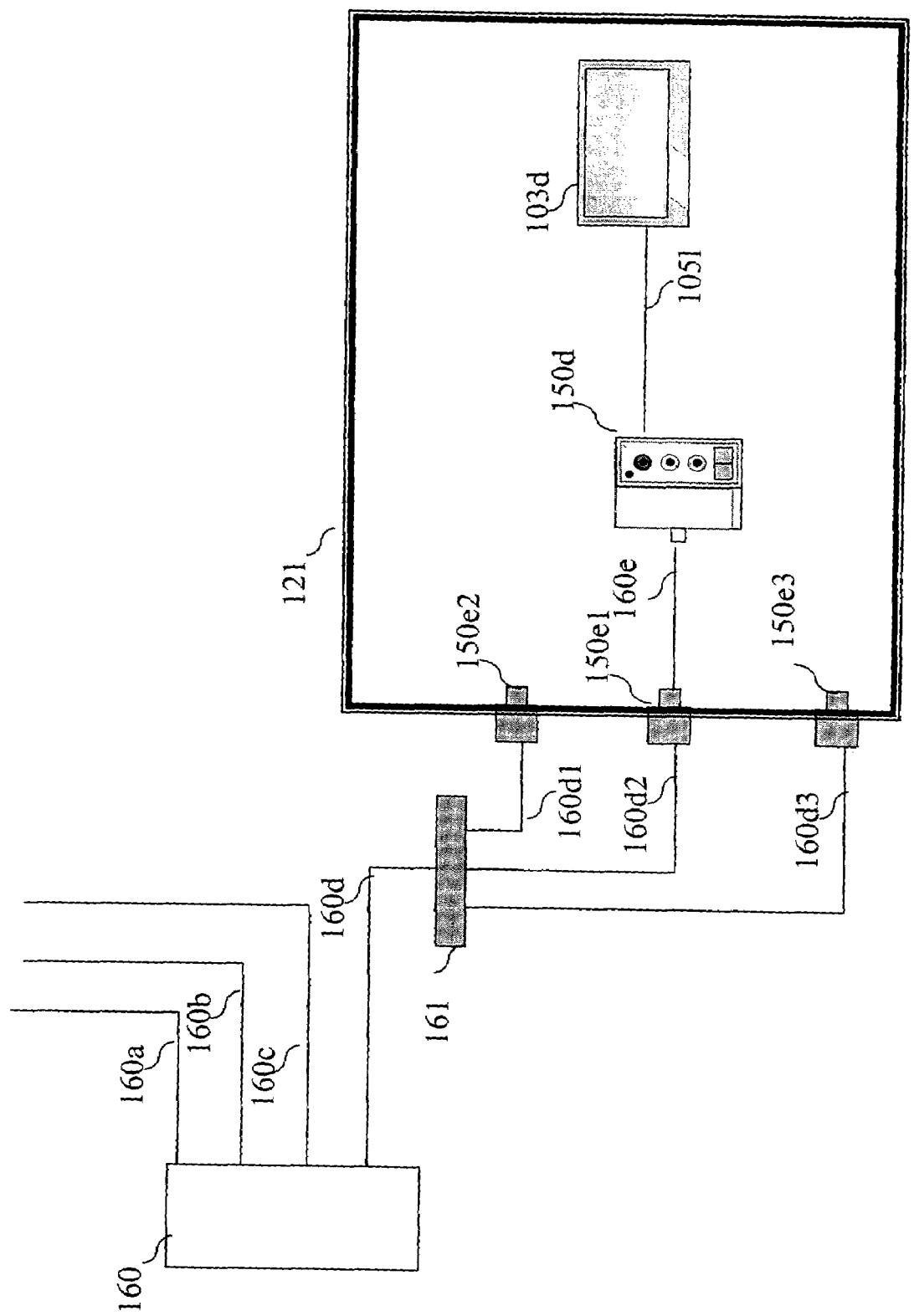

According to another variant, shown in FIG. 1c, users are offered the possibility to select one wall socket of RJ 45 type among a set of wall sockets for connecting multimedia interfaces. In FIG. 1c, the room 121 comprises several wall sockets disposed at different location within the room. The wall sockets 150e1, 150e2 and 150e3 are connected to a multiple rack 161, by means of single CAT 5 cables 160d1, 160d2 and 160d3, respectively. The multiple rack 161 is itself connected, by means of single medium 160d, such as a CAT5 type cable, to the central switching device 160. The multimedia interface 150d, not integrated to the wall, is connected by a means of a single medium 160e, more specifically a CAT5 type cable, to the RJ 45 type wall socket 150e.

The multiple rack 161 consists of a passive switching system that allows only one of the wall sockets 150e1, 150e2, 150e3 connected to the multiple rack 161, to be connected, at a time, to the central switching unit 160. As an example, as shown in FIG. 1c, only the wall socket 150e is connected to the central switching unit 160. In order to connect a wall socket other than the wall socket 150e1 to the central unit 160, it is necessary to modify the switch connection of the multiple rack 161. The modification of the switch connection of the multiple rack means the disconnection between the wall socket 150e1 and the central. In such a way, the multimedia interface 150d can be connected to another wall socket, within the room 121, as long as the switch connection of the multiple rack is modified, so that this particular wall socket is connected to the central switch.

Such implementation provides a better flexibility for the installation of appliances within a room. It further removes the obligation of directly connecting all the different several socket walls to the central switching unit and allows the use of less complex and less expensive central-switching units.

It should be understood that a multiple rack could be associated to one room or more. Similarly two or more multiple racks might be necessary to connect all the wall sockets of one room to the central switching unit.

Figure 2:
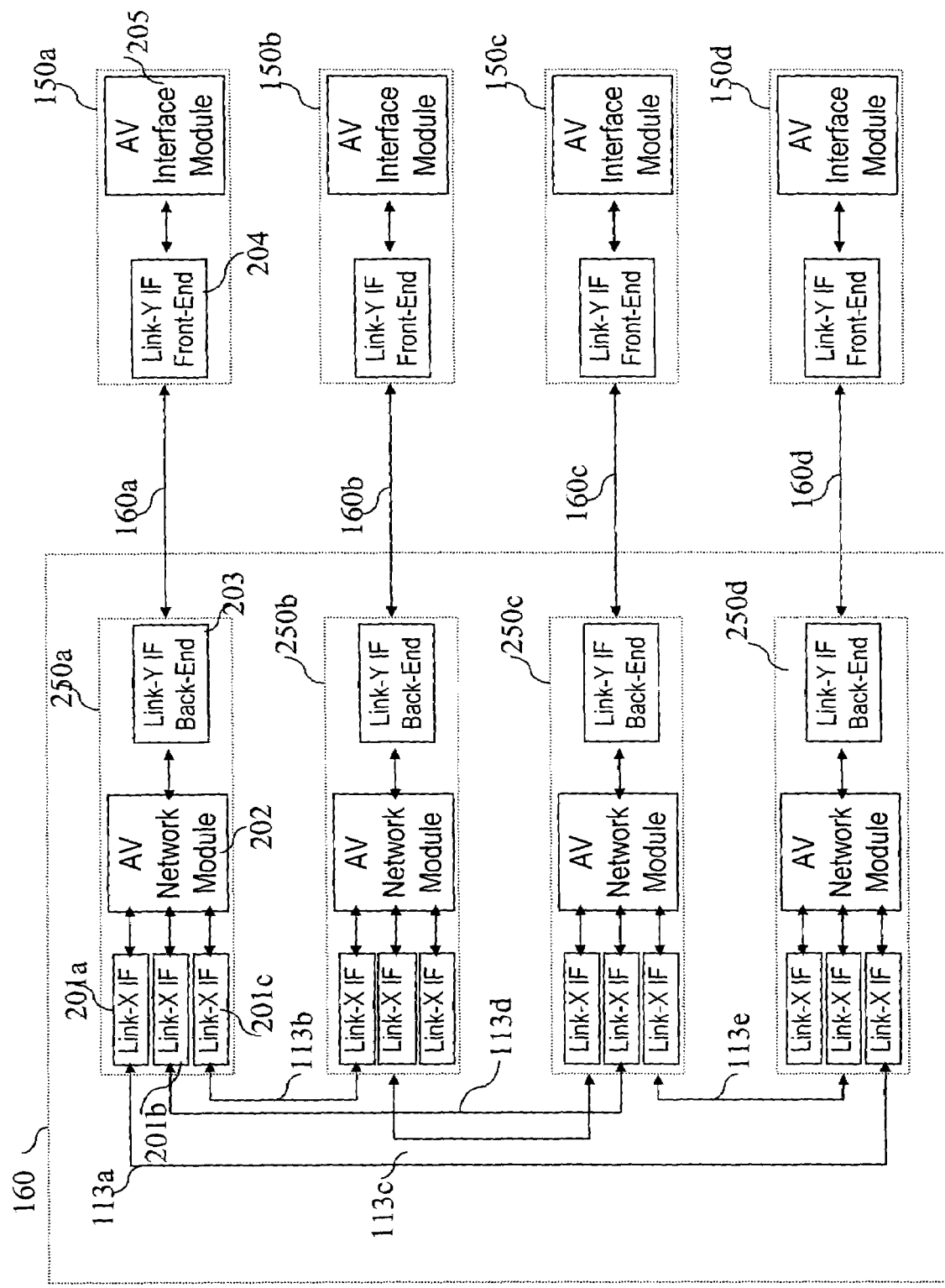
FIG. 2 is a block diagram representing the main constituent elements of the interface devices and switching devices.

Referring to FIG. 2, we shall now describe a block diagram representing the main constituent elements of the multimedia interface devices and switching devices according to the invention.

The central switching device 160 as described in FIG. 1b is formed by four switching devices referenced 250a, 250b, 250c and 250d. These switching devices are similar to the devices 100a, 100b, 100c and 100d described with reference to FIG. 1a. These four communications devices are interconnected by links referenced 113a, 113b, 113c,113d and 113e. These interconnections are identical to those described with reference to FIG. 1a, and shall not be described in greater detail.

The switching device 250a consists of a first interface module 203 called a Y link interface module, which shall be described in greater detail with reference to FIG. 5.

The switching device 250a furthermore comprises a second module 202 which is an audio/video module. This module shall be described in greater detail with reference to FIG. 4.

Finally, the switching device comprises interface modules 201a, 201b and 201c called X link modules.

It must be noted that the modules of 201a, 201b and 201c are similar to the module 203. It must also be noted that since the length of the links 113a, 113b, 113c, 113d and 113e is appreciably smaller than that of the links 160a, 160b, 160c and 160d, transmission bit rates on the links 113a, b, c, d and e could be far greater than those that can be envisaged on the links 160a, 160b, 160c and 160d which are about 100 Mbps.

The devices 250b, 250c and 250d are identical to the device 250a, and shall not be described in greater detail.

The switching devices 250a, 250b, 250c and 250d have multimedia interface devices respectively 150a, 150b, 150c and 150d connected to them respectively by means of a single cable 160a, 160b, 160c and 160d. The cable 160d is of course extended by a connector 150e and a cable 160e as described with reference to FIG. 1b. The multimedia interface device 150a consists of two modules referenced 204 and 205. The interface module 204, called a Y link interface module is identical to the module 203. The interface module 205, called an audio/video interface module, shall be described in greater detail with reference to FIG. 3.

Figure 3:
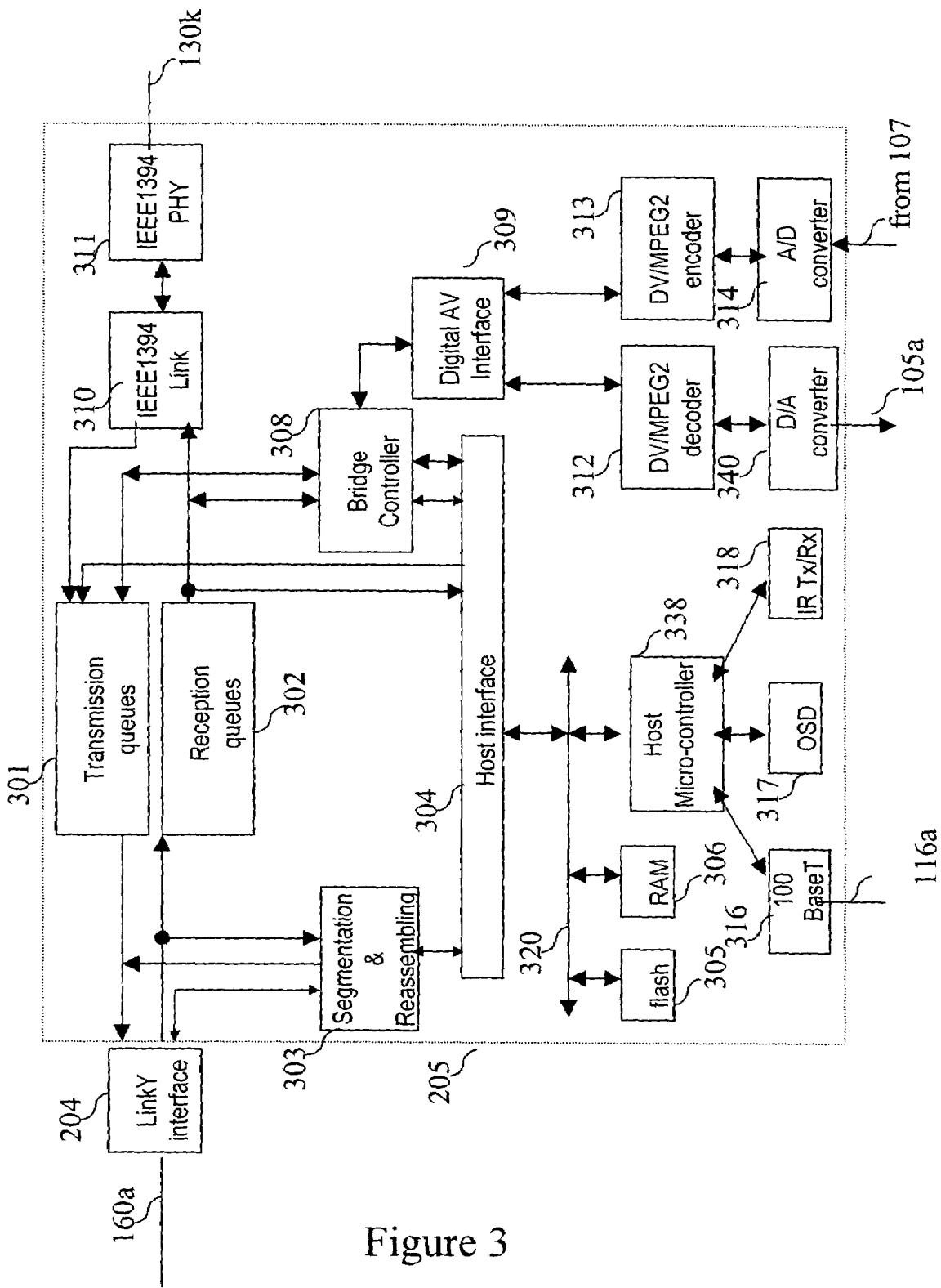
FIG. 3 is a block diagram of an audio/video interface module contained in a multimedia interface device.

FIG. 3 is the block diagram of an audio/video interface module included in a multimedia interface device 150a, 150b, 150c, 150d or 102a, 102b, 102c, 102d.

In general, an audio/video interface has a plurality of connection means by which signals of different kinds will be processed. The data coming from these connection means will be mixed with each other to form only one data stream compliant with a different protocol that is transmitted by means of the Y link interface on the single medium which, in the present case, is a CAT5 cable.

This audio/video interface 205 will also manage the QoS (quality of service) constraints associated with its different signals.

The audio/video interface has a microcontroller 338 which will transfer data on the bus 320 to RAM (Random Access Memory) type storage means 306 more particularly when the data comes from the link 160a.

When the multimedia interface device is powered on, the microcontroller 338 will load the program contained in the flash memory 305 into the RAM 306 and execute the code associated with this program.

The microcontroller 338 will transfer information coming from the different connection means to a transmission queue referenced 301.

This information will be transferred to the transmission queue 301 according to the quality of service required for the transfer of this information.

Indeed, the IEEE1394 type networks enable the exchange of isochronous or asynchronous type data. Isochronous data (which is the case here) is governed by transmission bit rate imperatives while asynchronous type data may be transmitted without being governed by transmission bit rate imperatives.

The transfer of data according to Quality of Service requirements is described in the European patent application No. 01400316 and shall not be described in greater detail in this document.

The microcontroller 338 has a 100baseT type Ethernet interface 316 connected to it. This interface 316 enables the connection of the cable 116a or 116b described here above with reference to FIGS. 1a and 1b.

A character generator 317, or on-screen display unit, is also connected to the microcontroller 338. This character generator 317 will enable the insertion of information, into the video signal transmitted on the link 105a for example.

An infrared transmission and reception module 318 is also connected to the microcontroller 338. Through this infrared module 318, infrared control signals coming from a remote control unit will be retransmitted by means of the microcontroller 338 to the different devices connected to the network. This transfer of infrared commands is described in the French patent application No. 0110367.

It must be noted that, in one variant, the infrared module is preferably a one-way device.

Through the bus interface 304, the microcontroller 338 will also manage the configuration of the transmission parameters associated with each transmission queue, these parameters being stored in the segmentation and reassembly module 303.

For the transmission queues associated with an isochronous data stream (i.e. "stream mode buffer" type queues), the segmentation and reassembly module 303 ensures the minimum transmission bit rate necessary for the isochronous type data stream from the transmission parameters.

For the transmission queues associated with an asynchronous type data stream (i.e. "message mode buffer" type queues), the segmentation and reassembly module 303 ensures a maximum transmission bit rate for the asynchronous type data from the transmission parameters.

The parameters of transmission by the microcontroller 338, associated with each transmission queue, are computed:
- as a function of a bandwidth reservation in the network for "stream mode buffer" type queues;
- locally as a function of an estimation of the bandwidth available in the network for the "message mode buffer" type queues.

The transfer of data according to these two modes of transmission is described in the European patent application No. 01400316 and shall not be described in greater detail in this document.

This data will come either from devices connected to the IEEE 1394 links referenced 130k, or from an analog device such as a VHS type video cassette recorder connected to the analog/digital converter 314, or a micro-computer type device connected to the Ethernet interface 316.

Should analog data come, for example, from a videocassette recorder 107, this data will be converted by the analog/digital converter 314 and then encoded in an MPEG2 or DV type format by the module 313. DV is the abbreviated form of the SD-DVCR (Standard Definition Digital Video Cassette Recorder) format. MPEG2 is the acronym for the Motion Picture Expert Group 2. It must be noted that the analog/digital converter 104a shown in FIG. 1a is integrated here with the multimedia interface device 150a.

This encoded data will then be transmitted by means of the digital audio/video interface 309 and the bridge controller 308 to the transmission queue 301.

Should data come from a device connected to the IEEE1394 type link referenced 130k, two types of processing will be carried out depending on the nature of the data.

If this data is asynchronous type data, it will travel through the bus interface 304 and be memorized in the memory 306.

The microcontroller 338 transfers this data to a "message mode buffer" type of transmission queue 301.

If the data is isochronous type data, it will travel directly to a "stream mode buffer" type of transmission queue 301.

The microcontroller 338 will also carry out the management, through the bus interface 304, of the distribution of data received by means of the Y link interface 204 and stored in the reception queue 302.

For isochronous type data and depending on the destination of this data, the microcontroller 338 will activate the transfer of the data either to the IEEE1394 type link controller referenced 310 if the data is intended for at least one of the terminals connected to the bus 130k for example, or to the bridge controller 308 if this data is addressed to a terminal connected to the link 105a for example.

For asynchronous type data, the microcontroller 338 will activate the transfer of the data to the RAM 306 through the bus interface 304. The Ethernet type asynchronous data will then be sent to the interface 116a.

The IEEE1394 type asynchronous data will then be sent to the interface referenced 311.

If the data is intended for a terminal connected to the link 105a for example, the microcontroller 338 will activate the transfer of this data to the audio/video digital interface 309 by means of the bridge controller 308. This MPEG2 or DV type data will then be decoded by the decoder 312 and finally transmitted to the analog/digital converter 340.

The segmentation and reassembly module 303 controls the sending of the data in the form of packets from the transmission queues towards the Y link interface 204. Each packet comprises a routing header as well as a packet type header (of the "message" or "stream" type depending on the transmission queue). The routing and packet type information is configured by the microcontroller 338.

Furthermore, the segmentation and reassembly module 303 controls the reception of the packets from the Y link interface 204 in order to store the data as a function of the type of packet in the appropriate reception queue which is either a "message mode buffer" or a "stream mode buffer" type of reception queue.

The decoder 312 will decode the information encoded either in a DV type format or in an MPEG2 type format. A digital/analog converter 340 is associated with this decoder and enables the transfer of the information in analog form to an analog television set 103a by means of a link 105a.

Figure 4:
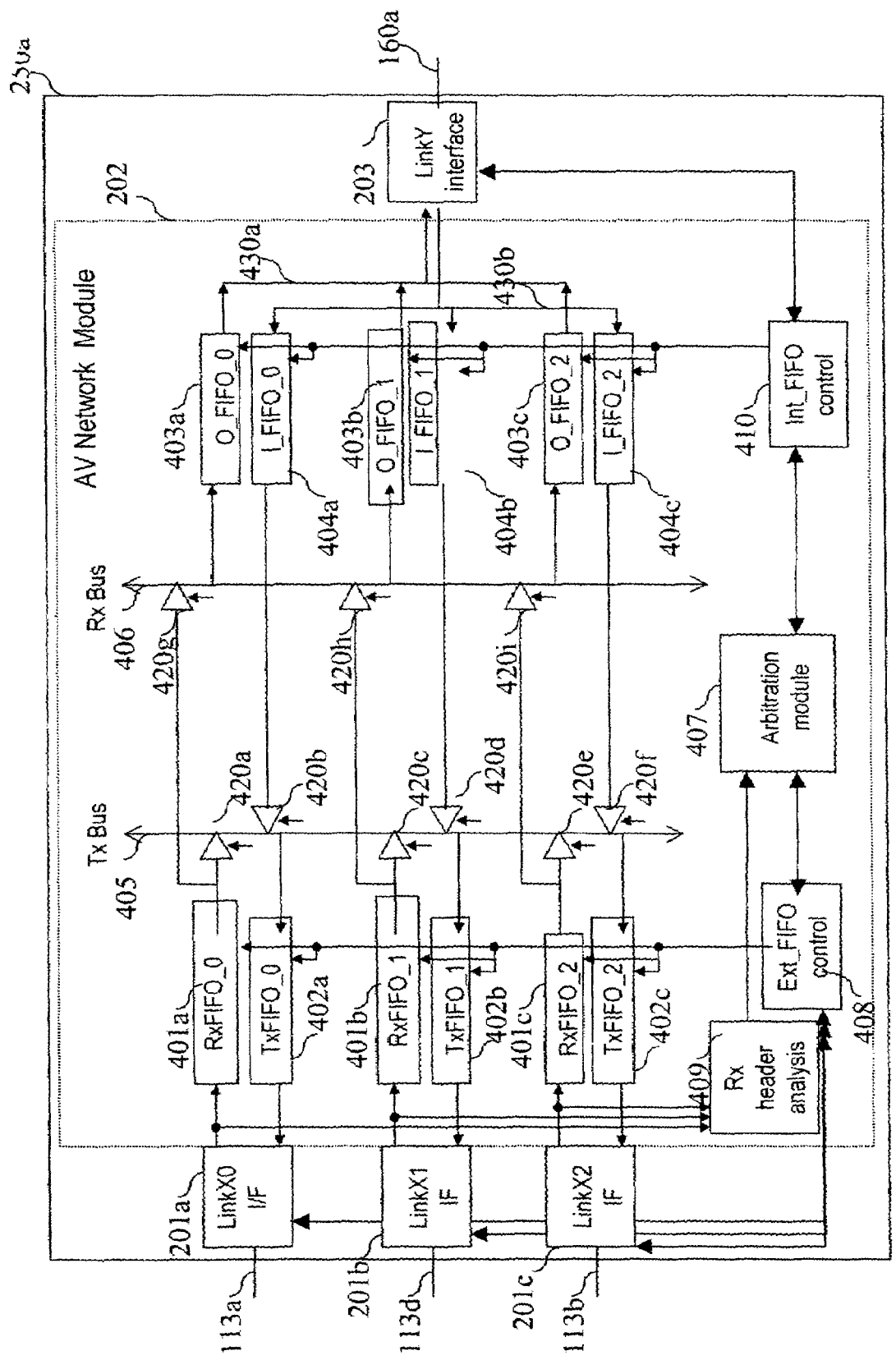
FIG. 4 is an electrical diagram of the audio/video network module contained in the switching device.

FIG. 4 shows the electrical diagram of the audio/video network module 202 whose task is to carry out the switching of the data, included in the switching device 250a. The audio/video network module 202 is connected to the X link interfaces 201a, 201b and 201c as well as to the Y link interface 203.

Each X link interface 201a, 201b and 201c has an associated reception memory respectively 401a, 401b and 401c and a transmission memory, respectively 402a, 402b and 402c. They are all FIFO type memories.

These memories are controlled by a control module referenced 408 which, firstly, controls the different operations of reading the FIFOs 401a, 401b and 401c and sending information to the bus 405 (referenced Tx Bus) or 406 (referenced Rx Bus) and, secondly, controls the operations for writing the data on the bus 405 to the FIFOs 402a, 402b and 402c.

Furthermore, the control module 408 also manages:
the reception of packets between an X link interface (201a, 201b and 201c) and its associated reception FIFO (respectively 401a, 401b and 401c).
the sending of packets to the X link interface (201a, 201b and 201c) and its associated transmission FIFO (respectively 402a, 402b and 402c).

The Y link interface 203 has three output memories 403a, 403b and 403c as well as three input memories 404a, 404b and 404c associated with it.

The three output memories 403a to 403c are connected through a bus 430a (MUX bus) to the Y link interface 203.

The three input memories 404a, 404b and 404c are connected through a bus 430b (DEMUX bus) to the Y link interface 203.

These memories are controlled by a control module referenced 410 which, firstly, controls the different operations for reading the FIFOs 404a, 404b and 404c and sending information to the bus 405 (Tx Bus), and, secondly, controls the operations for writing the data present on the bus 406 (Rx Bus) to the FIFOs 403a, 403b and 403c.

Furthermore, the control module 410 manages:
the reception of packets between the Y link interface 203 and the internal reception FIFOs (called input memories) 404a, 404b and 404c.
the sending of packets to the Y link interface 203 and the internal sending FIFOs (called output memories) 403a, 403b and 403c.

The input memories are selected by the control module referenced 410 as a function of the FIFO or buffer address information, extracted by the Y link interface 203.

An arbitration module 407 will control the connections between the different FIFOs. This arbitration module 407 controls the reading and writing in the above-mentioned memories by means of tristate buffers referenced 420a to 420i. These buffers, under the control of the arbitration module 407, will enable the exchange of the data contained in the memories 401a to 401c and 402a to 402c on a first transmission bus 405 or on a reception bus 406.

This arbitration module 407 will enable the transfer of information between, for example, the reception memory 401a and the transmission memory 402b or the transfer of information between, for example, the reception memory 401a and the output memory 403a.

The arbitration module 407 interconnects the different FIFOs from information transmitted by the header analyzer 409.

For the packet transmission between the Y link interface 203 and one or more of the X link interfaces 201a, 201b, 201c, this interconnection is predefined independently of the contents of the packet routing header. Thus a packet stored in the FIFO 404c (and 404b, 404a respectively) will be systematically transmitted to the FIFO 402c (402b, 402a respectively). Similarly, a packet stored in the FIFO 401a (and 401b, 401c respectively) and intended for the Y link interface Y 203 will be systematically transmitted to the FIFO 403a (and 403b, 403c respectively).

The header analyzer 409 will analyze the arrived data packets by analyzing the addresses contained in the headers of the packets and will generate FIFO interconnection requests intended for the arbitration module as a function of these addresses.

Figure 5:
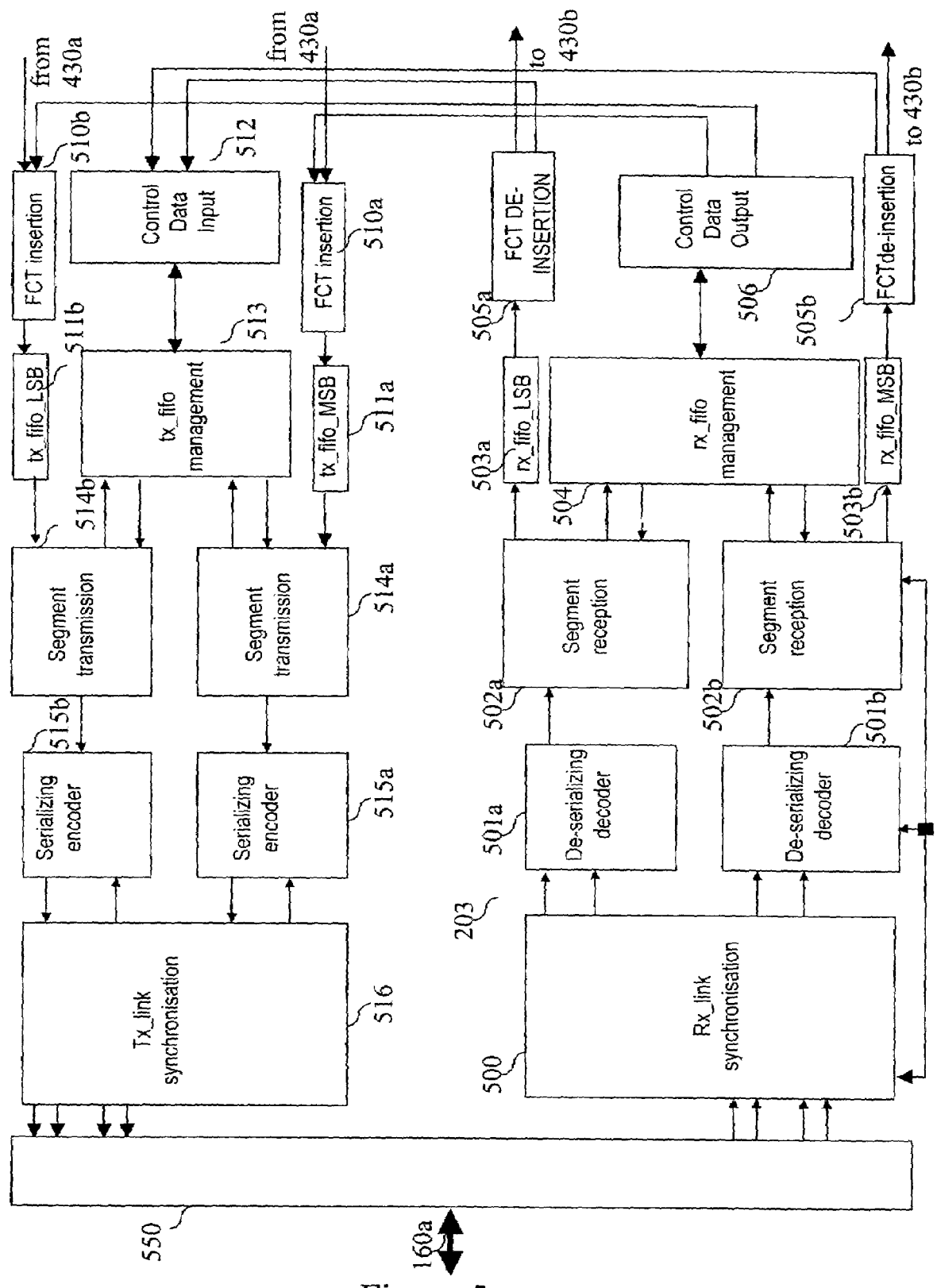
FIG. 5 is a block diagram of a Y link interface included in the multimedia interface device and the switching device.

FIG. 5 is a synoptic view of a Y link interface 203. It must be noted that the X link interfaces 201a, 201b and 201c are similar to a Y link interface and shall therefore not be described.

The Y interface link described here is identical, whether it is in a video interface module 150a, 150b, 150c, 150d or in a switching module 250a, 250b, 250c and 250d.

Figure 11B:
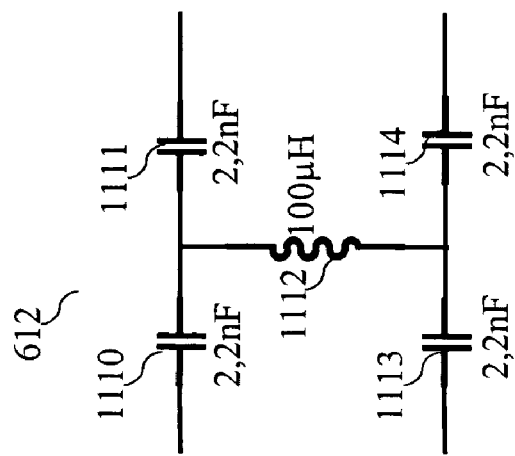
FIG. 11b is an electrical diagram of the bandwidth filter according to the second variant of the physical interface module.

The Y link interface 203 is connected for example to the transmission medium 160a. This link is set up by means of a physical interface module 550 described here below with reference to FIG. 6 in a first variant or with reference to FIG. 11 in a second variant.

This physical interface module 550 has a reception synchronization block 500 connected to it. This block 500 determines the binary value associated with each period of the signal received on a pair. It furthermore determines the start of the segment and informs the de-serialization block 501a and 501b of the binary value associated with each signal period received at the corresponding reception pair. One period corresponds to a cycle of 125 microseconds.

It must be noted that the data reaches the synchronization block 500 in the form of two signals. Indeed, according to the invention, the data is divided into two: a first part for the most significant bits is received on a pair of wires and a second part for the least significant bits is received on another pair of wires.

Thus the synchronization block 500 gives each de-serialization block a synchronization clock signal. It determines it from the signal received and thus determines the value of the signal for each of these periods.

The de-serialization blocks 501a and 501b will parallelize the data received, i.e. place each of them on eight bits.

When the data is parallelized, it is transferred to the segment reception blocks 502b for the segments containing the most significant bits and 502a for the segments containing the least significant bits.

These blocks 502a and 502b will rebuild the segments received and furthermore verify that the received segment is correct by carrying out, for example, a classic parity check on the received data. This check is known to those skilled in the art.

When this check is made, the block 502b transfers the reconstructed most significant segment to a FIFO type storage means 503b. It also generates an information signal, intended for the FIFO control module 504, on the presence of a new segment.

The block 502a performs the same operations as the block 502b but does so for the segments containing the least significant bits. This block shall not be described in greater detail.

The reception FIFO control module 504 informs the data output control module 506 about the reception of the totality of a segment, the segment comprising both least significant bytes stored in the FIFO 503a (rx_fifo_LSB) and most significant bytes stored in the FIFO 503b (rx_fifo_MSB).

The data output control module 506 informs the Int_FIFO control module 410, described here above with reference to FIG. 4, of the reception of a new segment.

The module 506 manages the insertion of the credit characters by the modules 510a and 510b as a function of the read operations on the storage means 503a and 503b, The control module 410 can then make a read request to read the data received through the modules for the analysis of the credits 505a and 505b.

The credit analysis modules 505a and 505b respectively extract, firstly, the information representing the FIFO memory or destination buffer (input FIFO 404a to 404c), secondly, the information representing a release of credit in a FIFO memory or remote reception buffer.

In a first alternative mode of implementation, the information representing the destination buffer or else the information representing a release of credit is determined from a control character inserted in the data field of the segment.

In a second alternative mode of implementation, the information representing the destination buffer or else the information representing a release of credit is determined from a predetermined field in the segment.

When the credit analysis modules 505a and 505b respectively identify a destination buffer, the information is transmitted through a control signal to the control module of Int_FIFO 410 so that this control module will select the input FIFO (404a to 404c) to which the data will be transferred.

When the credit analysis modules 505a and 505b respectively identify a credit release, the information is transmitted through a control signal to the data-sending module 512.

The data-sending module 512, manages the method of segmentation for the transmission of the packets from each of the output FIFOs (403a to 403c). The transfer of data from one of the output FIFOs (403a to 403c) firstly towards the FIFO for sending the most significant bytes 511a (tx_FIFO_MSB) and secondly to the FIFO for sending the least significant bytes 511b (tx_FIFO_LSB) is done through the credit insertion modules 510a for the least significant values and 510b for the most significant values.

Firstly, through control signals, the data-sending modules 512 receive credit release information coming from the credit analysis module 505a and 505b respectively.

Secondly, the data-sending module 512 receives read requests from the output FIFOs (403a to 403c) coming from the control module of Int_FIFO 410. The state machine describing the working of the data-sending module 512 shall be described further below with reference to FIG. 9.

Furthermore, the control module Int_FIFO 410 notifies the credit insertion module 510, when a predetermined number of pieces of data has been read in one of the input FIFOs (404a to 404c). The credit insertion modules 510a, and 510b respectively then insert a piece of information, into the segment, representing a release of credit associated with one of the input FIFOs (404a to 404c).

In an alternative mode of implementation, the information representing a release of credit is determined from a control character inserted into the data field of the segment described here below with reference to FIG. 8.

In another alternative mode of implementation, the information representing a release of credit is determined from a predetermined field in the segment: this shall be described here below with reference to FIG. 8.

The FIFO sending control module 513 notifies the data-sending module 512 of the sending of the totality of a segment, the segment comprising both the least significant bytes stored in the FIFO 511b (tx_FIFO_LSB) and the most significant bytes stored in the FIFO 511a (tx_FIFO_MSB).

The blocks 514a and 514b will carry out the transmission of the segments by computing the parity control field associated with the segment. They therefore inform the FIFO sending control module 513 of the end of transmission of each part of the (respectively least significant and most significant) segment.

The blocks 515a and 515b will make byte-by-byte transmission of each segment in the form of a binary string through the sending synchronization block 516. The sending synchronization block 516 is chiefly in charge of generating a synchronization signal at the head of a segment.

Figure 6:
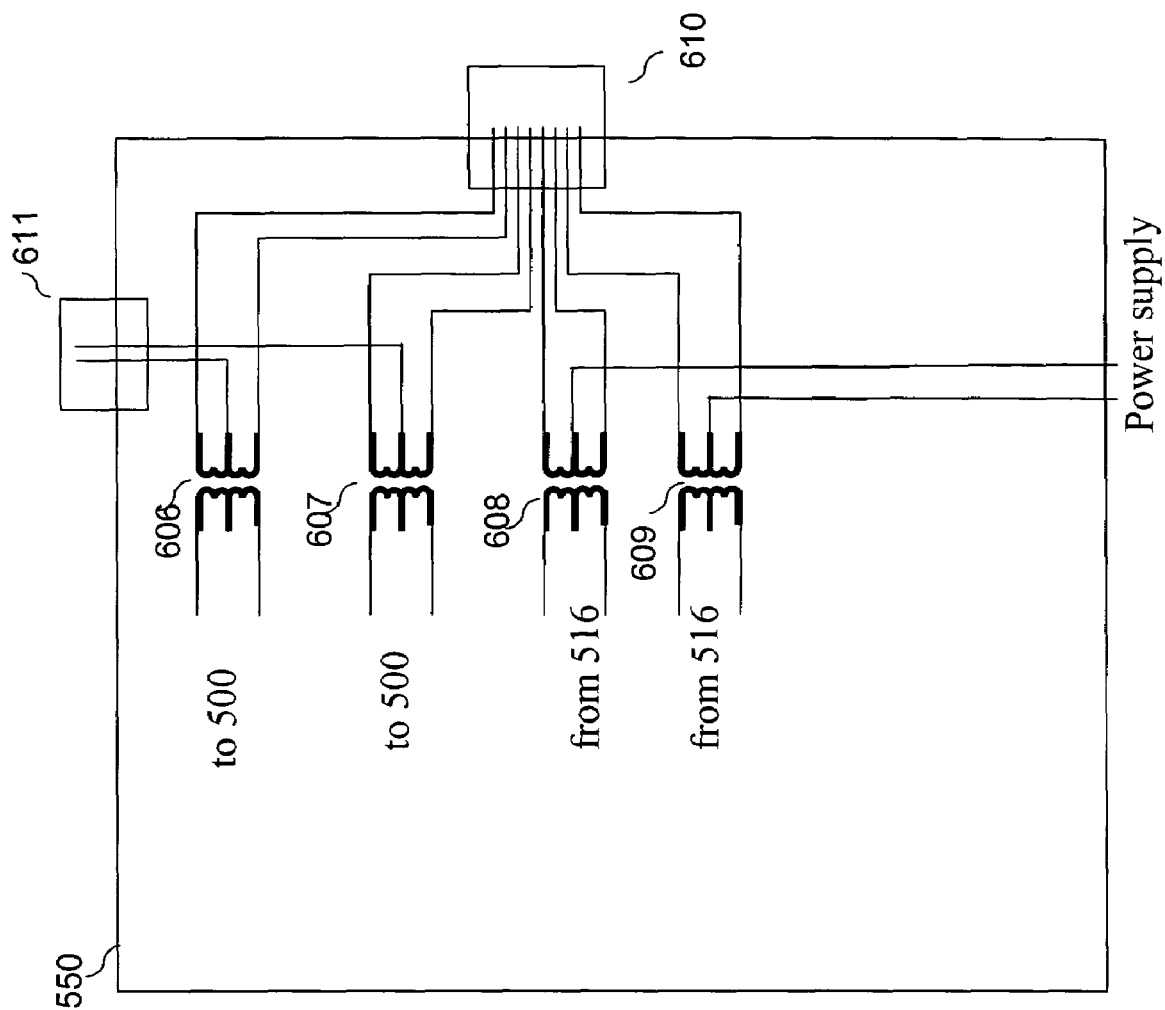
FIG. 6 shows a first variant of the physical interface module connecting the Y link interface and the transmission medium in the switching device.

FIG. 6 shows the physical interface module 550 connecting each Y link interface 203 and a transmission medium 160a, 160b, 160c and 160d respectively, in the present case a CAT5 type cable consisting of four pairs of twisted wires.

This physical interface module 550 is placed, for example, in a switching means 150a located in the central switching unit 160.

This interface module comprises a set of transformers referenced 606 to 609 which provide the galvanic insulation between the CAT5 cable and the reception synchronization block 500 and transmission synchronization block 516 described with reference to FIG. 5.

These transformers have a midpoint and are, for example, H2006A models commercially distributed by the firm Pulse.

Two transformers are dedicated to the transmission of information such as that described with reference to FIG. 8.

These are, for example, the transformers 608 and 609. Two transformers are dedicated to the reception of information such as that described with reference to FIG. 8. In this case, these are the transformers 606 and 607.

The transformers 606 and 607 are connected to the reception synchronization block 500 described in FIG. 5, the transformers 608 and 609 are connected to the sending synchronization block 516 described in FIG. 5.

The midpoints of the transformers 608 and 609 are connected to a classic DC supply, for example a power supply of about 48 volts.

The midpoints of the transformers 606 and 607 are connected to the public telephone network by means of a connection 611.

An RJ45 type connection means 610 connects the interface module to the CAT5 cable.

Figure 7:
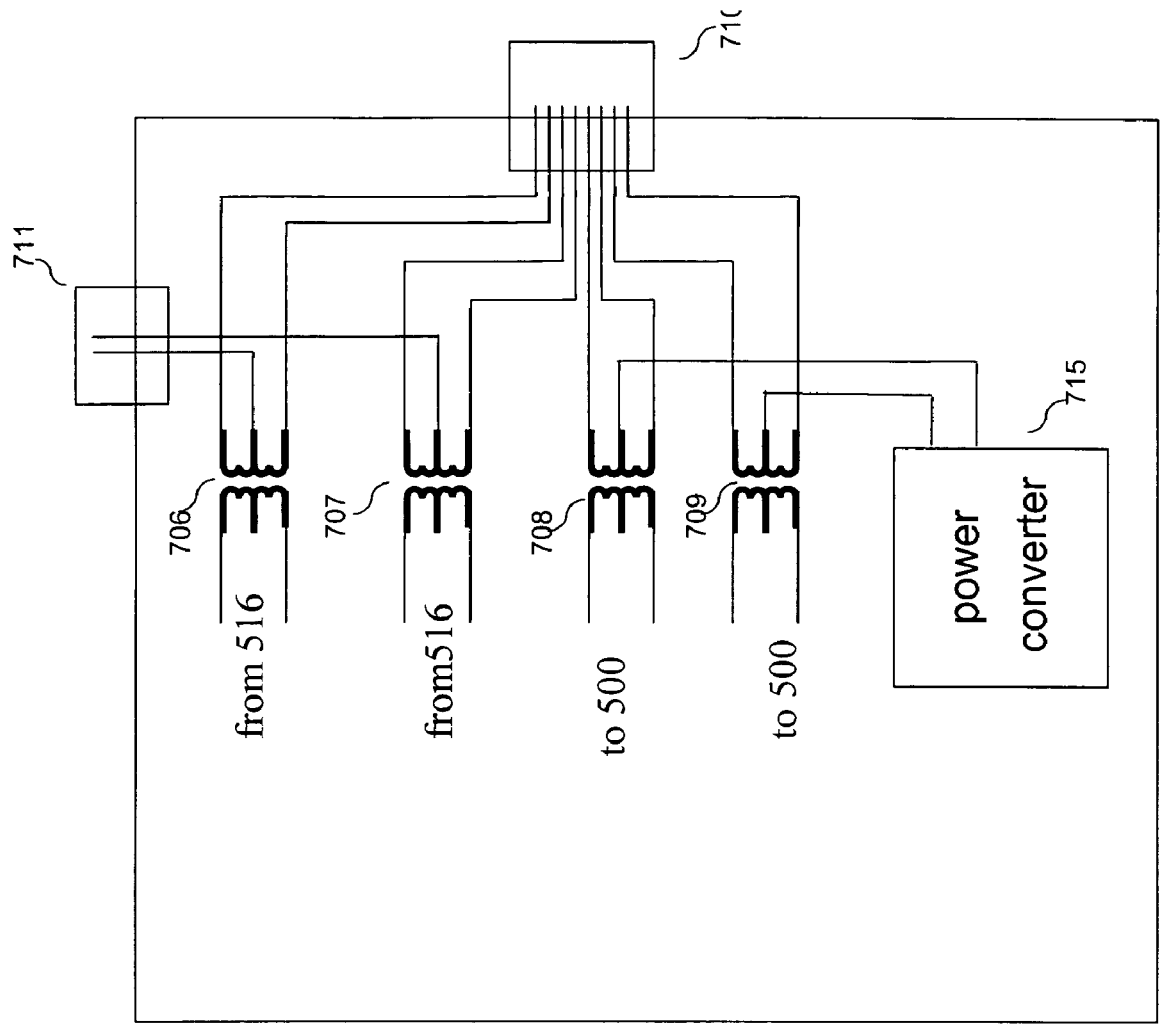
FIG. 7 shows the physical interface module connecting the Y link interface and the transmission medium in the multimedia interface device.

FIG. 7 represents the physical interface module 550 connecting the Y link interface of each of the multimedia interface devices 150a, 150b, 150c and 150d and the transmission medium 160a, 160b, 160c and 160d which, in the present case, are CAT5 consisting of four pairs of twisted wires.

The physical interface module 550 is placed, for example, in a switching means 150a which is itself placed, according to one variant, in a wall socket.

This interface module 550 comprises a set of transformers referenced 706 to 709 which provide the galvanic insulation between the CAT5 cable and the reception synchronization block 500 and transmission synchronization block 516.

These transformers comprise a midpoint and are, for example, H2006A models commercially distributed by the firm Pulse.

Two transformers are dedicated to the transmission of information such as that described with reference to FIG. 8. These are, for example, the transformers 706 and 707. Two transformers are dedicated to the reception of information such as that described with reference to FIG. 8. In this case, these are the transformers 708 and 709.

The transformers 708 and 709 are connected to the reception synchronization block 500 described in FIG. 5, the transformers 706 and 707 are connected to the sending synchronization block 516 described in FIG. 5.

The midpoints of the transformers 708 and 709 are connected to a classic voltage converter referenced 715. Owing to the characteristics of the CAT5 cable, which is formed by 24 AWG type conductors, the series resistance is about 20 ohm per hectometer for a pair of conductors.

In a particular case of the present invention, the power supply source will be of the order of 48 volts, and the voltage converter must be capable of giving a minimum power of 14 watts.

This energy is then distributed among the different components of the interface device 150a.

The midpoints of the transformers 706 and 707 are connected, by means of an RJ11 type connector 711, to a telephone set or any other device capable of communicating on a public telephone network such as a modem.

An RJ45 type connection means 710 connects the interface module to the CAT5 cable.

Thus, one and the same cable will take traffic of information coming from information sources according to the IEEE 1394 standard, Ethernet type information, audio/video information coming from analog devices such as videocassette recorders, this information traveling bi-directionally on two transmission pairs and two reception pairs. This cable will also take a telephone line and the electrical power supply of the multimedia interface device.

The telephone line uses the technique known as the "ghost pairs" technique on two pairs of twisted wires. The electrical power supply to the multimedia interface device uses the two remaining pairs in the same way.

As a variant, two distinct telephone lines may also be allocated, and the multimedia device can then be powered in another way, for example by a battery or by connection to the home electrical network provided that it is appropriately adapted.

As a variant, two power supplies may also be allocated, one replacing the telephone line. This makes it possible to furnish two different voltage power supplies or higher electrical power.

Figure 8:
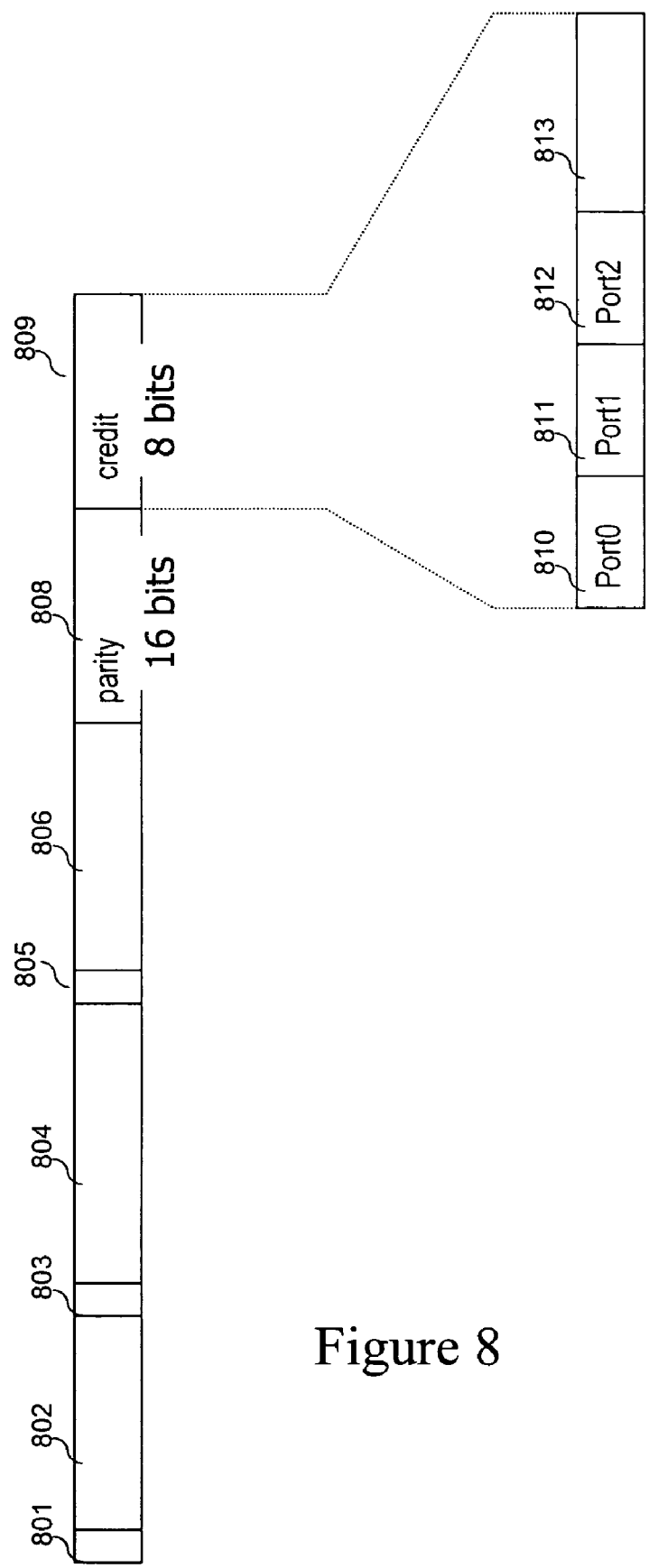
FIG. 8 shows the format of a segment transmitted on the transmission medium.

FIG. 8 describes the structure of the data segments transmitted on the cable 160a for example, to a switching device 250a, 250b and 250c.

A segment is constituted by an entity, not shown in the figure, comprising at least information needed for the synchronization of the synchronization bloc of the receiver. The segment then comprises a field of data referenced 801 to 806. The fields 808 and 809 are controlled fields of the segment. The sending of a segment is distributed among two independent pairs as mentioned with reference to FIG. 5. The field 801 comprises information representing the address of the FIFO type storage means contained in the audio/video network module for which the data contained in the field 802 is intended. This address corresponds for example to a code associated with the FIFO memory 404a described with reference to FIG. 4.

The fields 803 and 805 also comprise a code respectively associated with the FIFO memories 404b and 404c of FIG. 4.

The fields 804 and 806 comprise data intended respectively for the FIFO memories 404b and 404c of FIG. 4.

The field 808 encoded on eight bits is a field reserved for the insertion of information for the verification of the conformity of the data at the reception block segment 502a described with reference to FIG. 5.

In a classic way known to those skilled in the art, the bits of the segment at a predetermined level are counted and the counted number modulo 256 is inserted into this field.

At the receiver, this same counting of the bits of the segment is done. A simple comparison of the counted value with the value contained in the field 808 makes it possible to detect the presence or absence of error in the transmission.

According to one embodiment, the last field 809 contains information representing the quantity of recently released information, more specifically the credits in the storage means 404a to 404c.

This field is sub-divided into four sub-fields, and each of the sub-fields is encoded on two bits.

Each of the sub-fields 810, 811, and 812 is respectively associated with a storage means 404a, 404b and 404c of FIG. 4.

The following are the contents and meaning of these sub-fields:

00: no credit sent,
01: one credit sent,
10: two credits sent,
11: three credits sent.

The sub-field 810 indicates the credit pertaining to the storage means 404a, the sub-field 811 indicates the credit pertaining to the storage means 404b, the sub-field 812 indicates the credit pertaining to the storage means 404c, An additional sub-field 813 may be associated with an additional storage means.

According to another embodiment, the field 809 as well as the sub-fields 810, 811, 812 and 813 are not included in the segment.

Control characters are inserted into the fields 802, 804 and 806.

Table 1 describes the values of the different control characters as well as their meaning.

TABLE 1

| Credit 0 | 0xF01F | Available credit towards FIFO 404a |
|---|---|---|
| Credit 1 | 0xF027 | Available credit towards FIFO 404b |
| Credit 2 | 0xF033 | Available credit towards FIFO 404c |

Figure 9:
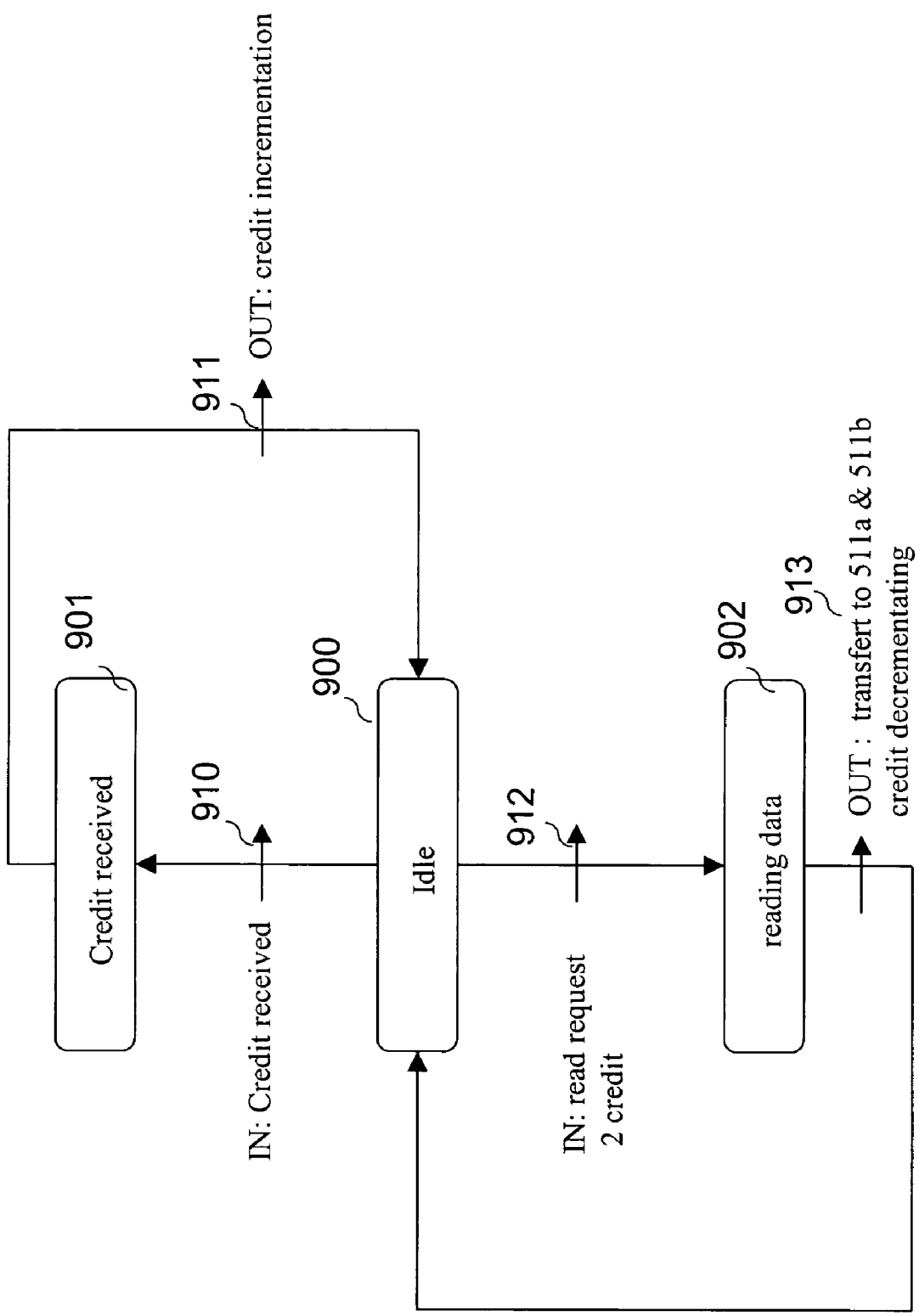
FIG. 9 describes the state machine associated with the data transmission module 512 described in FIG. 5.

FIG. 9 describes the state machine associated with the data-sending module 512. The data-sending module 512 can be in three possible states numbered 900 to 902 as a function of different events referenced 910 to 913.

This module awaits an event in the "idle" state 900.

In this state, two types of events may appear and effect a change in the state data-sending module. The first event referenced 910 consists of the reception, by the data-sending module 512, of credit release information coming from the credit analysis module 505. The second event referenced 912 consists of the reception, by the data-sending module 512 of read requests for reading at least one of the FIFOs 403a to 403c of FIG. 4. The change in state following the second event is conditional on the fact that the credit associated with the concerned FIFO is not zero.

On the reception of the first event 910, the data-sending module 512 goes into the "credit received" state referenced 901. When the event 911 consisting of the incrementation of the received credit takes place, the data-sending module returns to the state 900 described here above.

If, in the state 900, the data-sending module 512 receives an event such as the second event referenced 912 described here above, consisting of the reception, by the data-sending module 512, of read requests made by the control module Int_FIFO 410 for reading at least one of the FIFOs 403a to 403c and if the credit associated with the concerned FIFO is not zero, then the data-sending module goes to the step 902.

The data-sending module 512 will remain in the state 902 so long as the event 913 has not occurred.

This event consists of the transfer of a predetermined number of pieces of data from the FIFO at which the sending module has received a read request to the storage means 510a and 510b, 511a and 511b through the respective credit insertion modules 510a and 510b.

The event 913 also consists of a piece of information on decrementating of credit associated with the FIFO concerned.

At the occurrence of the event 913, the data-sending module goes back to the step 900.

Figure 10:
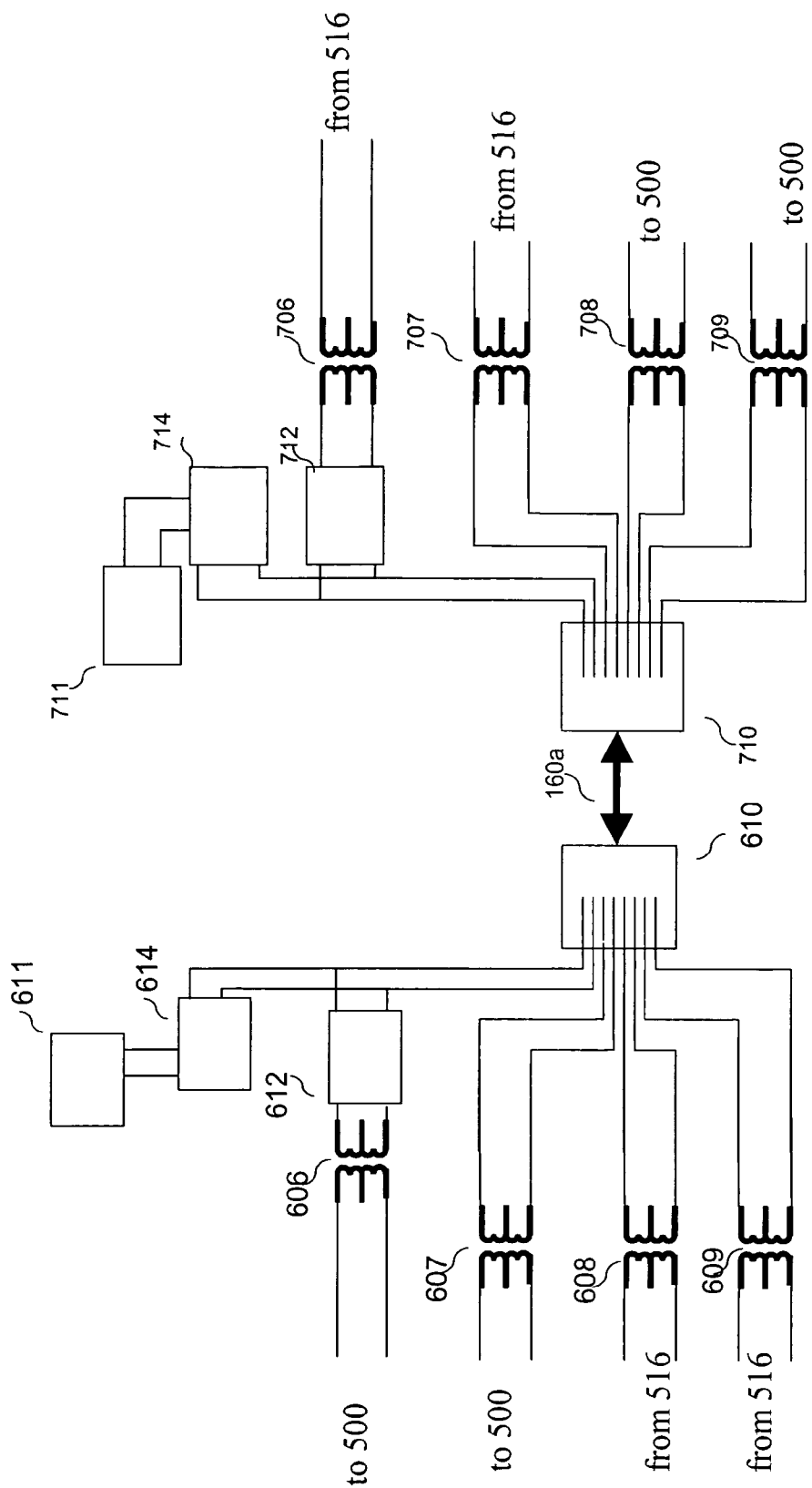
FIG. 10 shows a second variant of the physical interface module connecting the Y link interface and the transmission medium in the switching device.

FIG. 10 shows a second variant of the physical module interface connecting the Y link interface and the transmission medium in the switching device.

In general, the physical interface modules are identical to the physical interface modules as described with reference to FIGS. 6 and 7 apart from the fact that the telephone link is no longer given by means of "ghost pairs" but through a combination of low-pass filters and bandpass filters.

The transformers 606 to 609 are identical to those described with reference to FIG. 6 and shall therefore not be described.

The transformers 706 to 709 are identical to those described with reference to FIG. 7 and shall therefore not be described.

The connectors 610 to 611 are identical to those described with reference to FIG. 6 and shall therefore not be described.

The connectors 710 to 711 are identical to those described with reference to FIG. 7 and shall therefore not be described.

The supply of electrical power to the multimedia interface device as described with reference to FIGS. 6 and 7 is not shown in FIG. 10 for the sake of simplicity but may of course form part of this second variant.

In this variant, the multimedia interface device as well as the switching device comprise filtering means to filter signals coming from a telephone communications device, for example a telephone set connected to the unique cable pair constituting at least one pair.

A first filter 612 is placed between the secondary winding of the transformer 606 and the connector 610. The filter 612 is a bandpass filter and its function is to eliminate the signal associated with the telephone communication using the same twisted pair as the one connected to the secondary winding of the transformer 606. However, this same filter allows the data compliant with the data shown with reference to FIG. 8 to flow towards the secondary winding of the transformer 606.

This filter has a low cut-off frequency of about 350 Khz. With this cut-off frequency, the frequencies present on the telephone line are sufficiently attenuated to prevent any problem on the data.

It must be noted that this same cut-off frequency is compatible with the frequency spectrum of the data flowing on the twisted pair. This filter 612 is constituted by four capacitors referenced 1110, 1111, 1113 and 1114 in FIG. 11b and having a value of about 2.2 nanofarads. This filter also comprises an inductor referenced 1112, with an inductance of 100 microhenries.

The capacitors 1110 and 1113 are connected to the secondary winding of the transformer 606 and the capacitors 1111 and 1114 are connected to the connector 610.

The filter 712 placed at the multimedia interface device is identical to the filter 612 and shall therefore not be described in greater detail.

A secondary filter referenced 614 is placed between the secondary winding of the transformer 606 and the connector 611 enabling the link with the public telephone network. The filter 614 is a low-pass filter and its function is to eliminate the data compliant with that shown with reference to FIG. 8 and using the same twisted pair as the telephone. However, this same filter allows the telephone signal to flow towards the connector 611.

This filter has a cut-off frequency of about 20 Khz. With this cut-off frequency, the frequencies present on the telephone line are not attenuated.

Figure 11A:
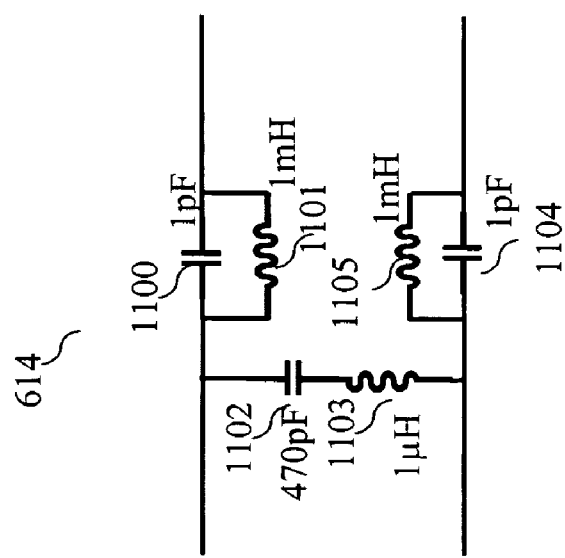
FIG. 11a is an electrical diagram of the low-pass filter connected according to the second variant of the physical interface module.

The filter 614 described in FIG. 11a is formed by a set of three capacitor referenced 1100, 1102 and 1105 and three inductors referenced 1101, 1103 and 1105.

The inductors 1101 and 1104 have a value of about one millihenry and the value of the inductor 1103 is about one microhenry.

The capacitors 1100 and 1105 have a value of about one picofarad and the inductor 1102 has a value of about 470 picohenry.

The link connecting the capacitor 1100 and the capacitor 1102 as well as the link connecting the capacitor 1104 and the inductor 1003 are respectively connected to the connector 611.

The link connecting the capacitor 1100 and the capacitor 1101 as well as the link connecting the capacitor 1104 and the inductor 1005 are respectively connected to the connector 610.

The filter 714 placed at the level of the multimedia interface device is identical to the filter 614, and shall therefore not be described in greater detail.

It must be noted that the filters described are non-restrictive examples. Those skilled in the art will be able, in a classic way, to use other filters in seeing to it that their input impedance values have transmission poles so as not the attenuate the signal.

Higher-order filters or even active filters could, of course, be used.

Naturally, the present invention is not limited to the details of the exemplary embodiments described herein but can be extended, on the contrary, to modifications within the scope of those skilled in the art, without departing from the framework of the invention.

What is claimed is:

1. A multimedia interface device for the transfer of information in a communications network, wherein the multimedia interface device comprises:
   at least one first connection means to which at least one first communications device, called a first sending device, can get connected by means of a first communications link compliant with a first protocol;
   at least one second connection means to which at least one second communications device, called a second sending device, can get connected by means of a second communications link compliant with a second protocol;
   means of connection to a single remote device by means of a single cable constituted by at least one pair, said remote device called a switching device comprising at least switching means between at least two ports, the switching means comprising input memories and transmission memories and being configured to systematically transmit packets stored in each input memory to a respective transmission memory to route packets through the switching device;
   means to mix the information sent out by said at least two devices into only one stream of information in the form of segments, each segment containing information representing an address of an input memory of the switching means, and being able to contain part of the information sent out by the first device and/or by the second device; and
   means to transfer the stream of information in the form of segments on said at least one pair of said cable to the switching device to which it is connected according to a third protocol different from the first and second protocols.

2. A multimedia interface device according to claim 1, further comprising means to obtain packets from the information sent out by the at least two devices, a segment being able to contain the obtained packets or part of the obtained packets.

3. A multimedia interface device according to claims 1, wherein the first protocol is a protocol adapted to the transfer of multimedia information by isochronous or asynchronous type data packets.

4. A multimedia interface device according to claim 3, wherein the first protocol is a protocol compliant with the IEEE1394 standard.

5. A multimedia interface device according to claim 4, wherein the mixing means comprise means for the reservation of bandwidth in the communications network.

6. A multimedia interface device according to claim 5, wherein the bandwidth reservation means ensure a minimum bandwidth for the isochronous type multimedia information and ensure a maximum bandwidth for the asynchronous type multimedia information.

7. A multimedia interface device according to claim 1, wherein the second protocol is a protocol adapted to the transfer of information by Ethernet type packets.

8. A multimedia interface device according to claim 1, wherein the interface device furthermore comprises means for the reception of information coming from the switching device to which it is connected, means to determine the connection means to which the device that is the destination of the information is connected and means for the transfer of that received information to the determined connection means.

9. A multimedia interface device according to claim 8, wherein the received information coming from the switching device is in the form of segments, one segment possibly comprising information intended for a plurality of destination or listener devices.

10. A multimedia interface device according to claim 9, wherein the segments furthermore comprise information representing the state of occupancy of the ports of the switching device to which the device is connected.

11. A multimedia interface device according to claim 1, wherein the cable consists of four pairs, of which two pairs are dedicated to the sending of information and two pairs are dedicated to the reception of information.

12. A multimedia interface device according to claim 11, wherein segments are transmitted on each of the pairs and wherein, on the transmission pairs dedicated to sending or reception, one pair transmits segments comprising most significant bits of the information bytes sent by the sending devices and the other pair transmits segments comprising least significant bits of the information bytes sent by the sending devices.

13. A multimedia interface device according to claim 1, wherein the cable consists of at least two pairs, and wherein the means of connection to the switching device comprise, for each pair, a midpoint-grounded transformer and wherein the interface device comprises means for obtaining electrical power connected to said midpoints of the transformers.

14. A multimedia interface device according to claim 1, wherein the cable consists of at least two pairs, and wherein the interface device comprises means for the connection of a telephone communications device to a telephone line by means of midpoints of two transformers.

15. A multimedia interface device according to claim 13, wherein the cable consists of four pairs, two pairs being dedicated to the sending of information and two pairs being dedicated to the reception of information, the telephone communications device is connected to the telephone line by means of midpoints of the transformers associated with the pairs dedicated to the transmission or reception of information, and the means for obtaining electrical power are connected to said midpoints of the other transformers.

16. A multimedia interface device according to 1, wherein the means of connection to a single remote device comprises a wall socket, integrated in a wall and connected to the single remote device and to the multimedia device by means of a single medium.

17. A multimedia interface device according to claim 16, wherein the multimedia interface device is located, outside the wall, on one side of the wall and the remote device is located on the other side of the wall.

18. A multimedia interface device according to 16, wherein the single medium is a CAT 5 type cable and the wall socket is a RJ 45 type socket.

19. A multimedia interface device according to claim 16, wherein the wall socket is connected to the single remote device through a multiple rack by means of a single medium, the multiple rack being connected to a plurality of wall sockets, and selectively allowing one of the plurality of the wall sockets to communicate with the single remote device.

20. A multimedia interface device according to claim 19, wherein the multimedia interface device is located, outside the wall, on one side of the wall and the remote device and the multiple rack are located on the other side of the wall.

21. A multimedia interface device according to claim 1, wherein the multimedia interface device comprises filtering means to filter signals coming from a telephone communications device connected to said at least one pair of the single cable.

22. A method for the processing of information in a multimedia interface device for the transfer of information in a communications network, the multimedia interface device comprising at least one first connection means to which at least one first communications device, called a first sending device, can be connected by means of a first communications link compliant with a first protocol, at least one second connection means to which at least one second communications device, called a second sending device, can get connected by means of a second communications link compliant with a second protocol, means of connection to a single remote device by means of a single cable constituted by at least one pair, the remote device called a switching device comprising at least switching means between at least two ports, the switching means comprising input memories and transmission memories and being configured to systematically transmit packets stored in each input means to a respective transmission memory to route packets through the switching device, and wherein the method comprises the steps of:
 the mixing of the information sent by the at least two sending devices into only one stream of information in the form of segments, each segment containing information representing an address of an input memory of the switching means, and being able to contain part of the information sent out by the first device and/or by the second device; and
 the transfer of the stream of information in the form of segments on the at least one pair of said cable to the switching device to which it is connected according to a third protocol different from the first and second protocols.

23. A method according to claim 22, further comprising the step of obtaining packets from the information sent out by the at least two devices, a segment being able to contain the obtained packets or part of the obtained packets.

24. A method according to claim 22, wherein the first protocol is a protocol adapted to the transfer of multimedia information by isochronous or asynchronous type data packets.

25. A method according to claim 24, wherein the first protocol is a protocol compliant with the IEEE1394 standard.

26. A method according to claim 25 wherein, during the mixing step, a bandwidth reservation is made in the communications network.

27. A method according to claim 26, wherein the bandwidth reservation means ensure a minimum bandwidth for the isochronous type multimedia information and ensure a maximum bandwidth for the asynchronous type multimedia information.

28. A method according to claim 22, wherein the second protocol is a protocol adapted to the transfer of information by Ethernet type packets.

29. A method according to claim 22, comprising a step for the reception of information coming from the switching device to which the interface device is connected, a step to determine the connection means to which the device that is the destination of the information is connected and a step for the transfer of said received information to the determined connection means.

30. A method according to claim 29, wherein the received information coming from the switching device is in the form of segments, one segment possibly comprising information intended for a plurality of destination or listener devices.

31. A method according to claim 30, wherein the segments furthermore comprise information representing the state of occupancy of the ports of the switching device to which the device is connected.

32. A computer-readable storage medium storing program code instructions for the execution of the steps of a method for the processing of information in a multimedia interface device for the transfer of information in a communications network according to claim 22, said program code instructions being executed on a computer.

* * * * *